H. HAISS.
FORGING PRESS.
APPLICATION FILED MAY 14, 1912.

1,061,839.

Patented May 13, 1913.
12 SHEETS—SHEET 5.

Witnesses—
Walter Chism
Nills A Burrowes

Inventor—
Hugo Haiss.
by his Attorneys
Howson + Howson

H. HAISS.
FORGING PRESS.
APPLICATION FILED MAY 14, 1912.

1,061,839.

Patented May 13, 1913.
12 SHEETS—SHEET 6.

Witnesses
Walter Chism
Wills A Burrows

Inventor
Hugo Haiss.
by his Attorneys
Howson & Howson

H. HAISS.
FORGING PRESS.
APPLICATION FILED MAY 14, 1912.

1,061,839.

Patented May 13, 1913.
12 SHEETS—SHEET 7.

Witnesses—
Walter Chism
Wills A. Burrows

Inventor—
Hugo Haiss.
by his Attorneys
Howson & Howson

H. HAISS.
FORGING PRESS.
APPLICATION FILED MAY 14, 1912.

1,061,839.

Patented May 13, 1913.
12 SHEETS—SHEET 8.

H. HAISS.
FORGING PRESS.
APPLICATION FILED MAY 14, 1912.

1,061,839.

Patented May 13, 1913.

Inventor—
Hugo Haiss.
by his Attorneys
Howson & Howson

UNITED STATES PATENT OFFICE.

HUGO HAISS, OF MARIETTA, PENNSYLVANIA.

FORGING-PRESS.

1,061,839.

Specification of Letters Patent.

Patented May 13, 1913.

Application filed May 14, 1912. Serial No. 697,297.

*To all whom it may concern:*

Be it known that I, HUGO HAISS, a subject of the Emperor of Germany, residing in Marietta, Lancaster county, Pennsylvania, having declared my intention of becoming a citizen of the United States, have invented certain Improvements in Forging-Presses, of which the following is a specification.

One object of my invention is to provide a forging press of the hydraulic intensifier type, having its various parts so arranged that its several operations may be conveniently and rapidly controlled by the manipulation of a single lever; the construction being such that the press is economical and efficient in operation as well as substantial and compact as to the arrangement and design of its various parts.

I further desire to provide a forging press having the above noted characteristics whose over-all height shall be materially less than is customarily the case in machines of the same general class and capacity; the invention contemplating a novel form of automatically acting valve mechanism whereby the operation of the steam intensifier is controlled.

I further desire to provide a machine of the above noted type in which the controlling lever and its associated mechanism shall be of novel form and mode of operation, and which, while accomplishing the varied adjustments of the reciprocating ram or movable anvil with the utmost exactness and certainty, shall be relatively simple in construction.

Another object of my invention is to provide novel means for preventing leakage between the plunger and the cylinder of the press with a view to permitting of the rapid insertion and removal of packing without dismantling the machine.

These objects and other advantageous ends I secure as hereinafter set forth, reference being had to the accompanying drawings in which:

Fig. 2 is a front elevation, partly in section, of the apparatus shown in Fig. 1; Figs. 3$^a$ and 3$^b$ are fragmentary sections on the lines $e$—$e$ and $f$—$f$, Fig. 2; Fig. 4 is a vertical section of the low pressure water and steam cylinders associated with the forging press; Fig. 5$^a$ is a section on the line $g$—$g$, Fig. 5; Fig. 18 is a rear elevation of a portion of the controlling lever and the movable catch associated therewith; Figs. 24 to 28 are front elevations illustrating the controlling lever and its various co-acting parts in certain of the positions occupied under operative conditions.

In the above drawings 1 represents the main supporting frame of the press which has a lower die or anvil 2 mounted on said frame, and an upper die or anvil 3. This upper anvil is mounted in any suitable manner at the lower end of a hydraulic cylinder 4, which is vertically slidable in a cylindrical cavity of the press frame provided at opposite sides with elongated vertically adjustable V-guides 5 which coöperate with suitably shaped guide ribs 6 on the sides of said cylinder 4. Said guides are longitudinally slightly tapered or wedge-shaped, being held in any adjusted position by a series of bolts 6ª and capable of being adjusted by a bolt 7 in engagement with the frame 1, when said bolts 6ª are properly loosened.

As shown in Figs. 3 and 9 to 11, inclusive, the upper part of the frame 1, adjacent the upper end of the guideways for the cylinder 4, has screwed or otherwise rigidly fixed to it a cap structure 8 preferably in the form of a casting having rigidly fixed to its suitably formed upper part 9, a stationary plunger 10 designed to coöperate with the hydraulic cylinder 4. It is noted that the cap structure is of relatively small vertical height and has within it a relatively short passage 11, communicating with a passage 12 extending through the plunger 10 and opening at the lower end thereof so as to be capable of delivering water into the interior of the cylinder 4. The opposite end of said passage 11 communicates with the water cylinder 13 of an intensifier, which cylinder is fixed to the cap structure 8 and is supported by the frame 1. In line with this cylinder is the steam cylinder 14 of the intensifier whose piston 15 has directly connected to it the plunger 16 which operates within the water cylinder 13. The plunger 10 is held to the cap structure 8 by bolts, of which one is indicated at 17, and in order to prevent leakage of water between the plunger and the cylinder, I provide a gland 18 having adjacent its upper end an annular series of radially projecting teeth 19 designed to fit between tooth shaped projections formed at the upper edge of the bore of the cylinder 4; the arrangement and proportion of parts being such that the teeth of the gland may enter the spaces between the projections of the cylinder and after passing below them, be brought respectively under the same by a partial revolution of said gland. Such revolution may be accomplished by providing a portion of the upper edge of the gland with gear teeth 20, and mounting on the upper edge of the cylinder 4 a removable toothed segment 21 in such position as to engage these teeth. Said segment is provided with an operating handle 22 and it has an axial spindle 23 fitting into a suitable recess in the upper cylinder end whereby it may be removably held in position to coöperate with the gland. Oppositely disposed bolts 24 are threaded into lugs on the gland in position to move this out of the cylinder when they are so turned as to act against the adjacent end thereof.

Any suitable form of packing 25 is mounted within the stuffing box of the cylinder 4 so as to surround the stationary plunger 10 at the point where it enters said cylinder; being confined in place by the gland 18 as above noted.

Figures 3, 13:
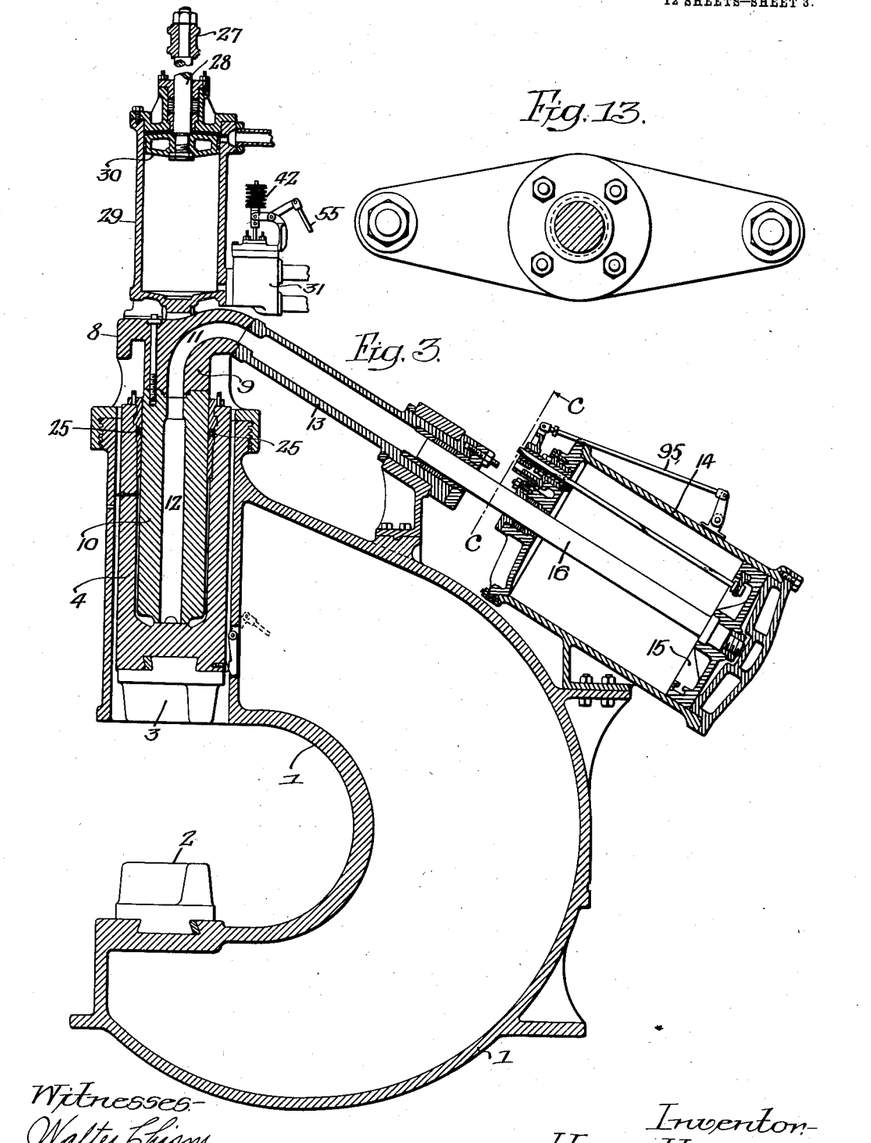
Fig. 3 is a vertical section on the line $a$—$a$ Fig. 2.
Fig. 13 is a transverse section on the line $c$—$c$, Fig. 3.
Figure 6:
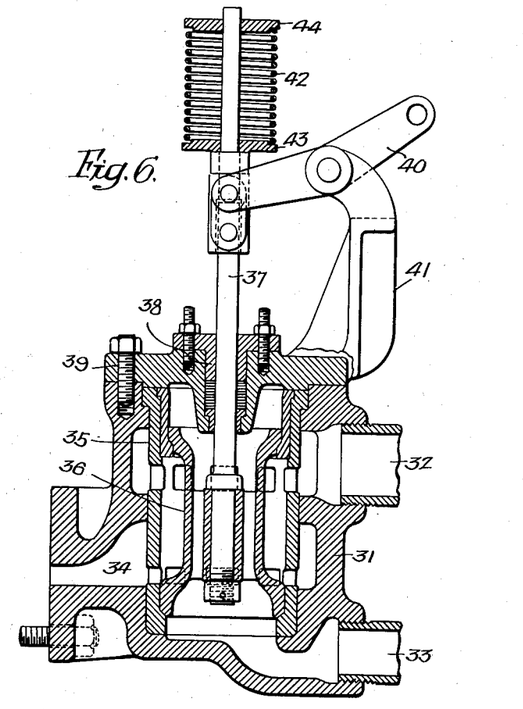
Fig. 6 is a vertical section of the controlling valve for the pull back cylinders.

The hydraulic cylinder 4 has connected to its upper end a pair of oppositely disposed rods 26 whose upper ends are connected to a cross head 27, which, as shown in Fig. 3, is in turn directly connected to the piston rod 28 of a pull back cylinder 29; the rod being attached to a piston 30 of said cylinder in any suitable manner. The cylinder itself is mounted directly upon the top of the cap structure 8 and steam is delivered to and exhausted from it through a valve 31. This latter is illustrated in detail in Fig. 6 and consists of a casing having a steam inlet pipe 32, a steam exhaust pipe 33, and a passage 34 leading to lower end of the pull-back cylinder 29. The casing of the valve has a vertically extending cylindrical cavity in which is mounted a bushing or cage 35 having within it the movable element 36 of the valve. Said element or valve proper has connected to it an operating rod 37 passing through a stuffing box 38 in the bonnet or cover 39 of the valve casing and connected to a lever 40 fulcrumed on the bracket 41 carried by the valve casing. The movable element of the valve is normally maintained in a position permitting the steam to flow through the inlet pipe 32 to the passage 34 leading to the cylinder 29 by means of a spring 42, and also by reason of the steam pressure acting on the valve as a differential piston. Said spring acts between a plate 43 on the rod 37 and a second plate 44 connected by side bolts 45 with the valve casing structure.

Figure 7:
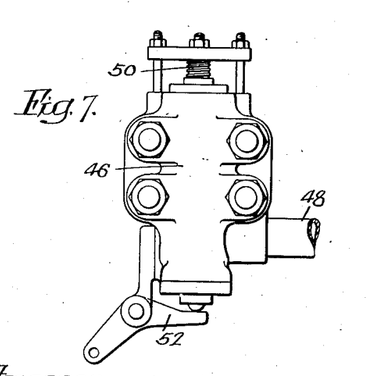
Figs. 7 and 8 are respectively a side elevation and a vertical section of the check valve for the press cylinder.
Figure 8:
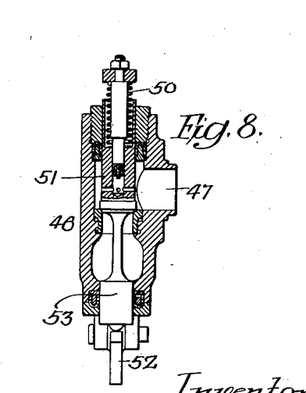
Figure 9:
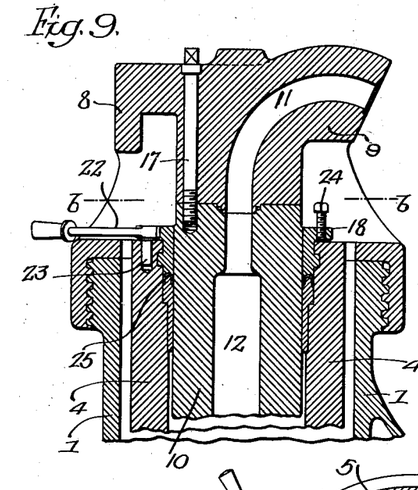
Figs. 9 and 10 are vertical sections illustrating the detail construction of the apparatus for preventing leakage between the press cylinder and its fixed plunger.
Figure 10:
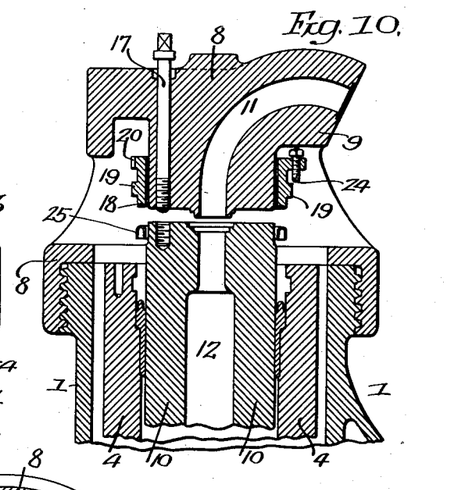
Figure 11:
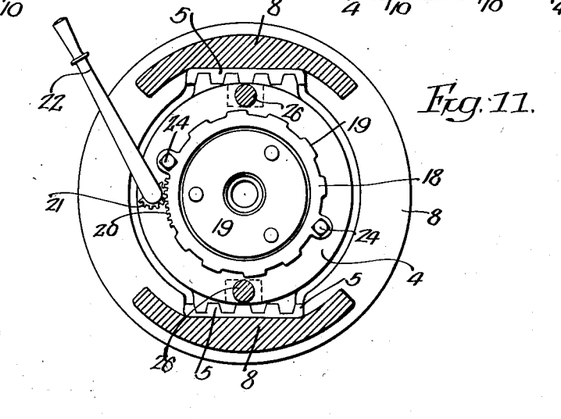
Fig. 11 is a horizontal section on the line $b$—$b$, Fig. 9.

Mounted on the cap structure 8 is a check valve 46 of the construction shown in Figs. 7 and 8, connected through a passage 47 with the conduit 11 of the cap structure, and also connected through a pipe 48 with a water supply cylinder 49 hereafter described. By means of a spring 50, the movable element 51 of this valve tends to remain in such a position as to cut off flow of fluid from the passage 11 to the pipe 48, although when desired it may be brought to its open position by means of a lever 52 acting on a rod or extension 53 connected to said element 51. This lever 52 is connected through a rod 54 to the single operating lever of the press in a manner hereafter described, and the lever 40 of the controlling valve for the pull-back cylinder is likewise connected to said operating or controlling lever through a rod 55.

Figure 1:
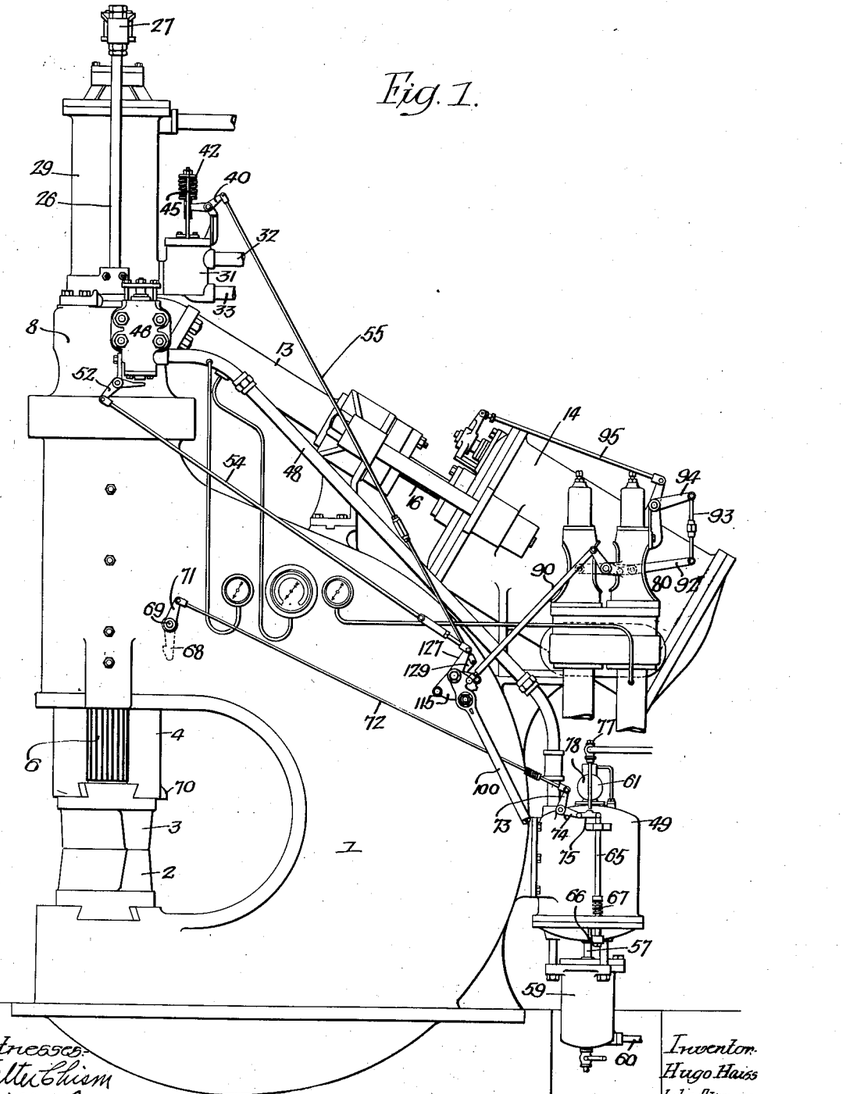
Figure 1 is a side elevation of a forging press constructed according to my invention.
Figures 2, 3A, 3B, 4:
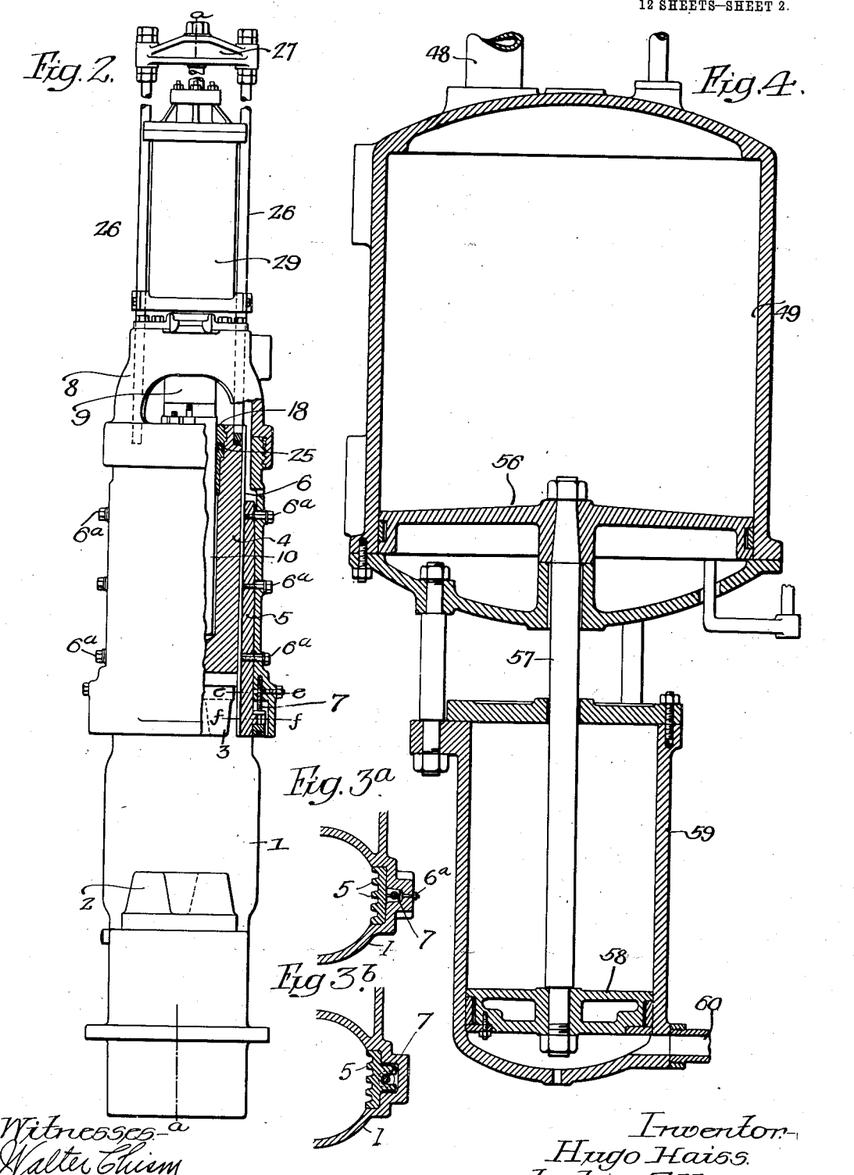
Figure 12:
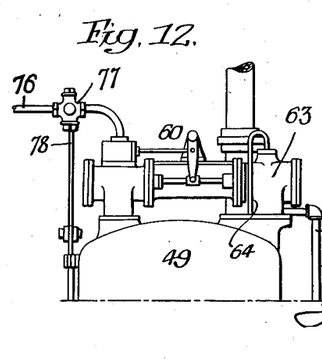
Fig. 12 is a side elevation of the upper part of the low pressure water supply cylinder illustrating the mechanism associated therewith.
Figure 13:
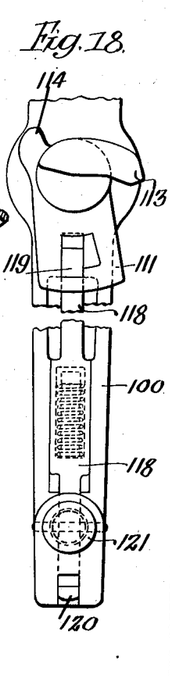

The water cylinder 49, as shown in Figs. 1, 4 and 12, is preferably though not necessarily, mounted on the main frame 1 of the press, having within it a piston 56 connected through a rod 57 with a piston 58 of the steam cylinder 59. This latter cylinder is connected through a pipe 60 with a suitable source of steam at a substantially constant pressure so that under operating conditions the steam at all times exerts pressure on the piston 58 and through the rod 57 and piston 56, causes pressure to be exerted on the body of water within the cylinder 49 above this latter piston.

The water supply cylinder 49 is connected to the check valve 46 as above noted, by a pipe 48 which enters its upper portion, and it is supplied with water by means of a steam pump 61 shown as mounted on the top of said cylinder. While the inlet 62 of the water cylinder 63 of this pump is connected to any suitable source, its discharge pipe 64 empties directly into the cylinder 49 and the operation of the pump is controlled automatically by the mechanism shown in Figs. 1 and 12. For this purpose there is provided a rod 65 guided at the side of the water cylinder 49 and having on its lower end a tappet 66, extending into said cylinder in position to be engaged and moved downwardly whenever the piston 56 is at or immediately adjacent the lowest portion of its stroke. Said rod with this tappet normally tends to remain in its uppermost position under the action of the spring 67 as shown in Fig. 1.

Mounted on the main frame 1 of the press adjacent the press cylinder 4 is a lever arm 68 so placed as to be engaged and turned on its supporting spindle 69 by a projection 70 on the lower end of said cylinder 4, whenever the latter is at the upper end of its stroke. Fastened to said spindle 69 is a second lever arm 71 connected through a rod or link 72 with one arm 73 of a lever mounted on the water cylinder 49 and having its second arm 74 pivoted to one end of a bar 75 whose second end is pivoted to the rod 65. The steam supply pipe 76 for the pump 60 has in it a normally closed throttle valve 77 provided with an operating stem 78 so placed as to be moved upwardly so as to open said valve whenever the link 75 is moved upwardly by the lever arm 74 as hereafter described.

Figure 5:
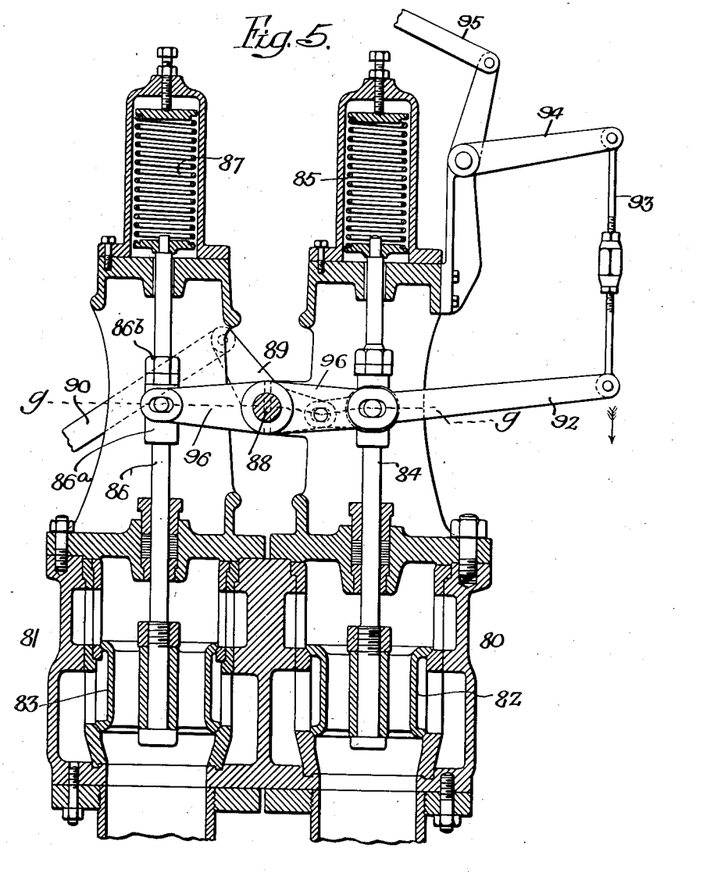
Fig. 5 is a vertical section illustrating the detail construction and arrangement of the valves for the steam cylinder of the intensifier.
Figure 5A:
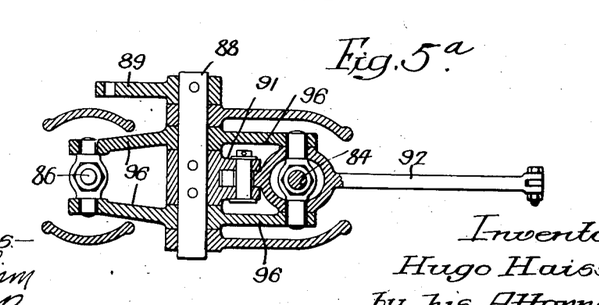

The steam cylinder 14 of the intensifier is provided with a steam valve 80 and an exhaust valve 81 mounted adjacent its lower end and connected to control the flow of steam toward and from said end. While these valves are of any suitable construction, I preferably make them as shown in Fig. 5, with piston drop valves 82 and 83, of which the first has connected to it an operating rod 84 at all times acted on by a spring 85 so as to be normally held in its closed position thereby as well as by the steam pressure. The exhaust valve 83 is also of the piston type and has a controlling rod 86 through which it is normally held closed by means of a spring 87 and steam pressure. For operating these valves I provide a rotatable spindle 88, suitably supported on the valve casing structure and having fixed to it an arm 89 connected through a link 90 with the single controlling lever 100, as hereafter described. Pinned or otherwise suitably fixed to this spindle 88 is a second lever arm 91 movably connected to one arm of a lever 92 fulcrumed to a sleeve slidable on the steam valve rod 84; the arrangement being such that upward movement of the lever 92 from its normal position raises the valve rod through an abutment thereon, while downward movement of said sleeve does not affect said rod. The other arm of the lever 92 is connected through an adjustable link 93 and a bell-crank lever 94 with a rod 95 in turn connected to the floating valve gear herein described.

Rotatably mounted on the spindle 88 are two levers 96 which at one end are pivoted to the sleeve on the steam valve rod 84 and at their opposite ends are pivoted to a second sleeve on the exhaust valve rod 86, the arrangement being such that when the steam valve is open and the exhaust valve closed, a movement of the long arm of the lever 92 in the direction of the arrow, (Fig. 5), first permits closing of said steam valve under the action of the spring 85, and if continued, thereafter causes opening of the exhaust valve by reason of the action of the sleeve 86ᵃ on the abutment 86ᵇ on the rod 86.

Figure 14:
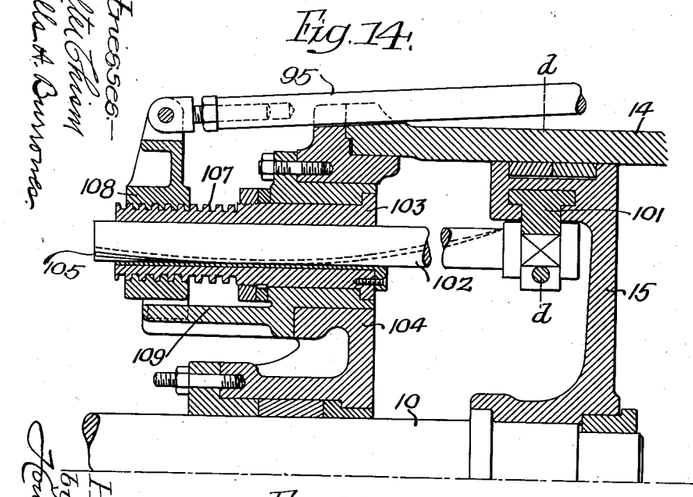
Fig. 14 is an enlarged vertical section illustrating the detail construction of the floating valve gear and its associated parts.
Figure 15:
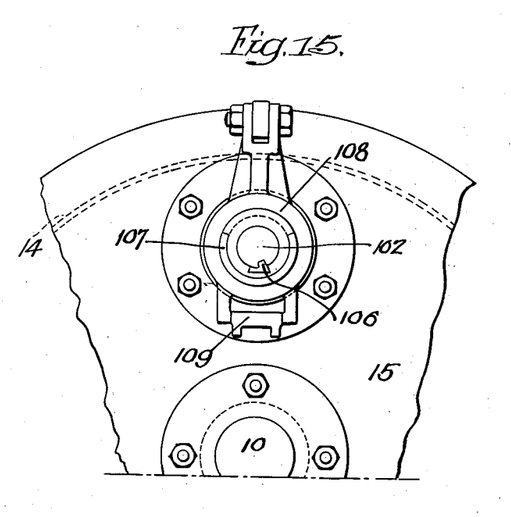
Fig. 15 is a fragmentary elevation further illustrating the apparatus shown in Fig. 14.
Figure 16:
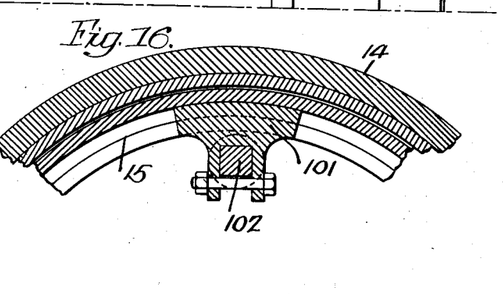
Fig. 16 is a fragmentary vertical section on the line $d$—$d$, Fig. 14.
Figure 17:
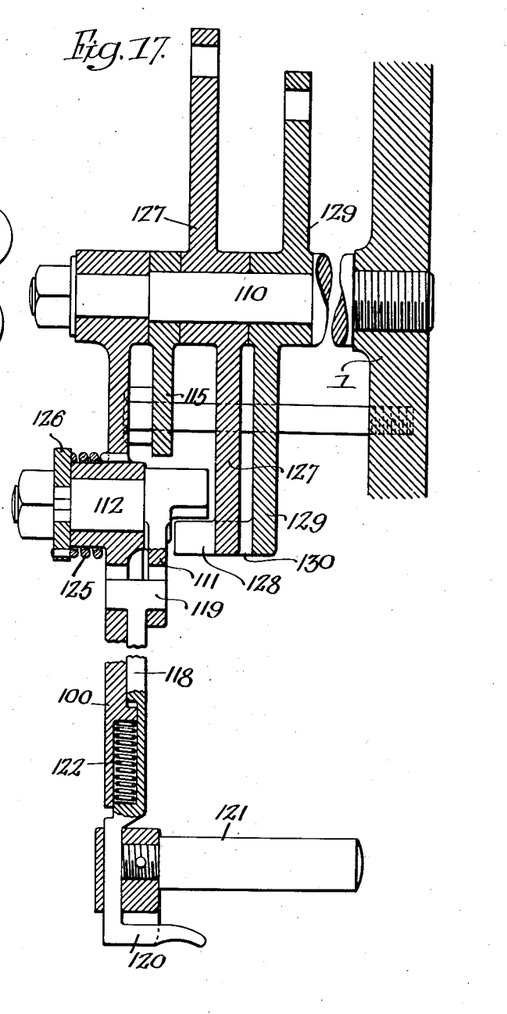
Fig. 17 is a vertical section taken through the controlling lever and its associated parts.

The floating or automatic valve gear of the steam cylinder of the intensifier is shown in detail in Figs. 14 to 16, inclusive, and involves a slot of T section formed in a part of the piston 15 projecting from or constituting a portion of its outer or upper face. In this slot is mounted a block 101 preferably formed at its outer end for the reception of a rod 102 which extends through the upper head 104 of the cylinder 14, and is slidable within a rotatable externally threaded bushing 103 mounted in said head. This rod 102 is formed with an elongated helical slot 105, designed to receive a key or spline 106 fixed to or forming part of the bushing 103, so as to compel rotation of the latter when said rod is moved longitudinally through it. That portion of the bushing 103 projecting beyond the cylinder head is provided with threads 107 for the reception of a correspondingly threaded nut 108 guided and prevented from rotation by means of a projecting track structure 109 carried by the cylinder head 104. Thus while the nut 108 is free to move longitudinally on its guide or track 109 toward and from the cylinder head 104 under the action of the rotatable nut 103, it cannot turn. The rod 95, however, is connected to this nut so as to be moved longitudinally by it, and thereby cause closing of the steam valve with or without opening of the exhaust valve, as hereafter described.

Figures 19, 20, 21, 22, 23:
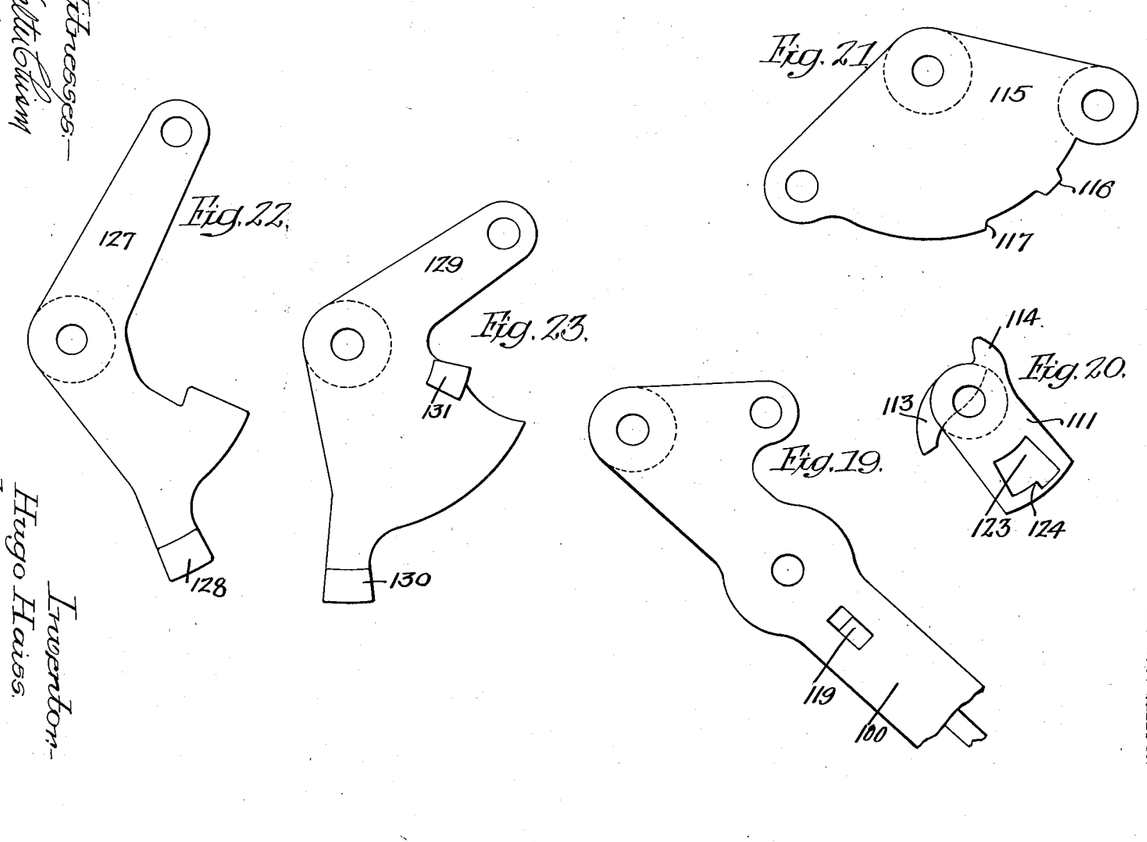
Figs. 19 to 23 are front elevations of the pivoted end of the controlling lever and certain of the parts associated therewith.

The single operating lever 100 is loosely mounted on a stud bolt 110 at one side of the frame 1, as shown in Fig. 1, and has pivotally mounted on it within a short distance of said stud a plate 111, shown in Fig. 20, rigidly fixed to or formed integral with a pivot bolt 112. Projecting from this plate, is a pawl 113 and a trip projection 114, of which the latter is designed to be acted upon by the specially formed edge of a segment 115 non-rotatably fixed on the stud bolt 110 by means of two stud bolts extending into the frame. This segment, as shown in Fig. 21, has a projecting tooth 116 and a shoulder 117 either of which may act on the projection 114 of the plate 111, as hereafter described.

Slidably mounted on the operating lever 100 is a longitudinally extending rod 118 carrying at its inner end a trigger 119 and at its opposite end provided with a hand grip 120 adjacent to a handle 121, mounted on or formed as part of the outer end of said operating lever. A spring 122 so acts on the rod 118 that it is normally retained in its outer position and the plate 111 is provided with an opening or recess 123, as shown in Fig. 20, for the reception of the trigger 119; said recess having a shoulder 124 for engagement with said trigger whereby the plate may be held in a definite position.

A spring 125 is mounted on the inner end of the controlling lever 100, with one of its ends connected to said lever, and its opposite end connected through a washer 126 and the pivot bolt 112 with the plate 111; the parts being so assembled that the shoulder 124 of said plate is normally pressed against the trigger 119. The arrangement is such that when, through pressure exerted on the hand grip 120, the trigger is moved out of engagement with the shoulder 124, the plate 111 is free to turn to a limited extent relatively to the operating lever 100, as determined by the recess which is entered by said trigger.

As shown in Figs. 1, 2 and 5, the operating lever 100 is connected to the link 90 for operating the steam inlet and exhaust valves of the intensifier cylinder 14, so that any movement of said lever necessarily involves a movement of said link and the valve mechanism.

Also mounted on the stud bolt 110 is a lever 127, one of whose arms is connected through the rod 54 with the check valve 46 while its other arm is provided with a lug 128 projecting at right angles to its general plane, so that under certain conditions, it may be engaged and moved by the pawl 113 of the plate 111. Immediately adjacent this lever 127 on the stud bolt 110, is a second lever 129, one of whose arms is connected through the rod 55 with the controlling valve of the pull back cylinder 29 while its second arm is provided with a projection 130, which, like the projection 128 of the lever 127, extends into the path of movement of the pawl 113. In addition this lever 129 has a second projecting lug 131 capable of engaging the lever 127 and moving it when said first lever is actuated under pre-determined conditions.

Figure 26:
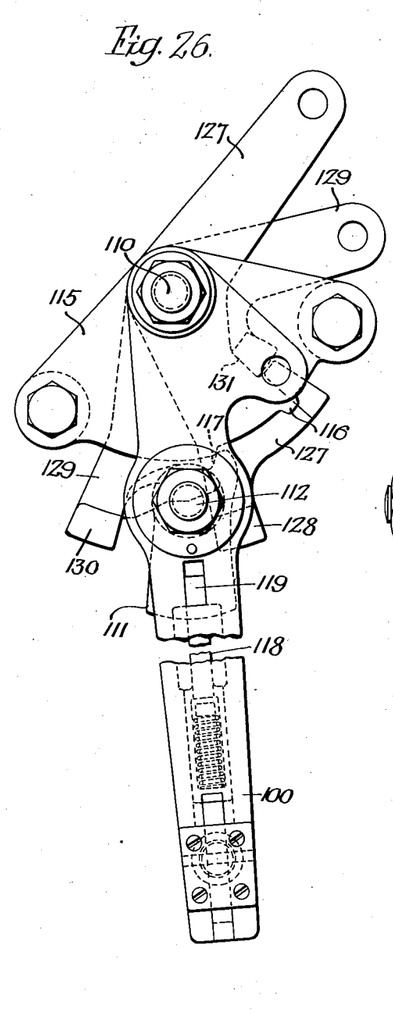
Figure 29:
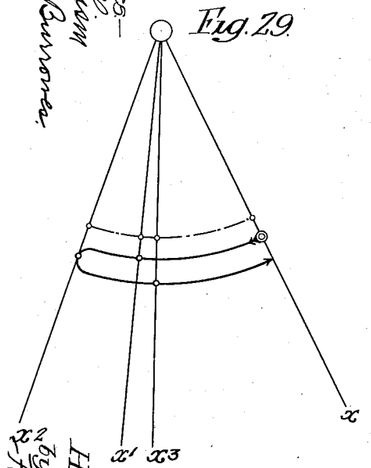
Figs. 29 to 31, inclusive, are diagrams illustrating the various operations of the press when the controlling lever is moved.
Figure 30:
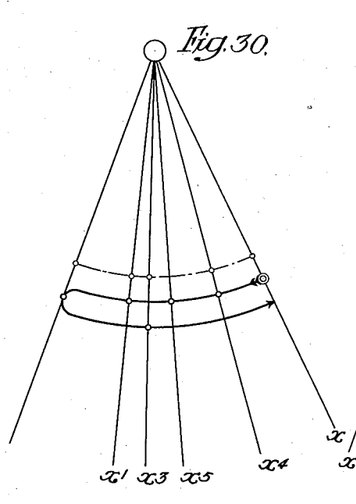

Under operating conditions steam at about 125 lbs. pressure is supplied from a suitable source to the valve 31 of the pull back cylinder and since, as noted, said valve is normally in its open position, such steam passes to the pull back cylinder 29 under the piston 30 which is thereby raised to the top of said cylinder. As a consequence the press cylinder 4 is moved to the position shown in Fig. 3, with the upper anvil raised to the upper end of its stroke. If it be assumed that the cylinder 49 has previously been filled with water, steam at about 125 lbs. pressure to the square inch is now admitted through the pipe 60 under the piston 58 of the cylinder 59 and at the same time steam is also admitted to the steam cylinder 61 of the pump. If now the operating lever 100 be moved from its central position to the position shown in Fig. 27, and thereafter the rod 118 be moved inwardly by pressure upon the handle grip 120, the spring 125 will act to cause the trigger 119 to disengage the shoulder 124 of the plate 111 so that this will move to the position illustrated in Fig. 27 with its pawl 113 in position to engage the lug 128. Said operating lever is now moved toward the neutral position shown in Fig. 24, whereupon the pawl 113 through said lug 128 turns the lever 127 on its pivot bolt and through the rod 54 opens the check valve 46. As a consequence, water is forced from the cylinder 49 through the pipe 48 into the passage 11 of the cap 8 and into the water cylinder 13 of the intensifier, as well as into the plunger 10 and the cylinder 4, filling all spaces. Thereafter movement of the operating lever to its neutral position causes the toe or projection 114 of the plate 111 to engage the tooth 116 of the fixed segment 115 with the result that said plate is turned on its pivot into such a position that the pawl 113 releases the lug 128 and permits the lever 127 to move to such a position as to allow closing of the valve 46. At the same time the trigger 119, under the action of its spring 122, returns to the position shown in Fig. 24, while the plate is held in its releasing position by the trigger 119. Shortly thereafter the continued operation of the steam pump 60 again fills the tank 49 with water so that its piston 56 is forced down and finally comes into engagement with the tappet 66, pushing this with the rod 65 downwardly. The link 75 is thus moved down and the valve rod 78 is therefore free to move down under the action of the steam passing through the valve 77 which is thus closed. It will be understood that the above noted action occurs against the steam pressure of about 125 pounds to the square inch on the piston 58 in the cylinder 59, and if at any time when the press cylinder 4 is in its uppermost position, the cylinder 49 should not be full of water, the lug 70 on said cylinder, through the arms 68 and 71, rod 72 and lever arms 73 and 74 would so move the link 75 as to force upwardly the valve rod 78 opening the valve 77. Steam would thereby be admitted to the steam pump 61 and water would be forced into the tank 49 to replace that forced from it through the pipe 48 to the press cylinder or to the water cylinder of the intensifier. If it now be assumed that the press cylinder 4 and the passages 12 and 11, with the water cylinder 13, are filled, the machine is ready for operation and if it be desired to operate the intensifier alone, the operating handle 100 is moved toward the left from its central or neutral position, shown in Fig. 24 and indicated at $x$ in Fig. 29. When it reaches the position indicated at $x^1$, the valve 82 begins to open by reason of the movement transmitted from the lever 100 through the rod 90, levers 89, 91 and 92, thereby admitting steam to the cylinder 14 of the intensifier. The piston 15 of said cylinder is thereby moved so as to force the ram 16 into the water cylinder 13 with the result that the press cylinder 4 is forced downwardly through a high pressure working stroke which may vary from 3 to 5 inches. By the time that the operating lever reaches the position indicated at $x^2$ in Fig. 29, the steam valve 82 is full open and the intensifier is thus permitted to deliver its full working stroke. It is to be noted, however, that under the action of the floating valve gear, the piston 15 is caused to move a distance which depends precisely upon the amount of movement given to the operating lever, for as the ram 16 is forced into the cylinder 13, the rod 102 through the key 106 rotates the bushing 103. This so moves the nut 108 and the rod 95 that the lever 94, the link 93, and lever 92, are moved to close the admission valve 82. Should the piston 15 still continue to move after the steam valve had been closed owing to the expansion of the steam already in the cylinder 14, the continued turning of the bushing 107, through the above described parts, would so move the lever 92 as to open the exhaust valve 83 through the levers 96 and the rod 86, it being noted that the mounting of the levers 96 and 92 on the rod 84 is such as to permit of their sliding down on said rod to cause the above described movement of said levers 96. Since the forcing downwardly of the press cylinder in its guides to make a working stroke is necessarily in opposition to the force of steam exerted in the pull back cylinder, the opening of the exhaust valve 83 of the intensifier at once permits the steam in said pull back cylinder to act through the piston 30, piston rod 28, cross head 27, and side bars 26, to again raise the press cylinder 4 to its upper position. The return of the lever 100 from the position $x^2$ toward its neutral or central position causes it on reaching the position indicated at $x^3$ to open the exhaust valve 83 after closing the steam valve 82, even if said exhaust valve had been opened by the excessive travel of the intensifier piston 15 as above noted. If the piece to be forged be of such dimensions that it is necessary to lower the upper anvil 3 prior to the beginning of the working stroke of the intensifier, pressure is exerted upon the hand grip 120 so as to move the trigger 119 out of engagement with the shoulder 124 of the plate 111, which at once turns relatively to the operating lever 100 under the action of the spring 125 so as to raise the pawl into position to engage the lug 130 of the lever 129. As the operating lever 100 is thereafter moved from its central position $x$ (Fig. 30), said pawl by reason of its engagement with the lug 130, moves the lever 129 with its connected parts so that when the operating lever reaches the position $x^4$, the steam valve 36 of the pull back cylinder is closed; at the same time, owing to the engagement of the lug 131 of the lever 129 with the lever 127, the check valve 46 is caused to open. Owing to the continued pressure of steam in the cylinder 59 acting on the piston 58, water is forced from the cylinder 49 through the pipe 48 and check valve 46, the valve being full open by the time the operating lever reaches the position $x^5$ (Fig. 30), and since the controlling valve of the pull back cylinder is in its exhausting position, the press cylinder 4 is moved downwardly. The operating lever with its various parts then occupies the position shown in Fig. 26, and a slight further movement of the said lever results in the shoulder 117 of the segment 115 acting on the projection 114 of the plate 111, causing said plate to be turned and the pawl 113 moved out of engagement with the lug 130. By the time, therefore, that the press cylinder with the upper anvil has moved down into engagement with the piece to be operated on as above described, the lever 129 under the action of the spring of the valve 31 has returned to its neutral position, as has also the lever 127, under the action of the spring forming part of the check valve 46. The movable element of the valve 31 thus returns to the position in which steam is admitted to the pull-back cylinder and the movable element 51 of the check valve immediately returns to a position in which communication between the pipe 48 and the passage 11 is cut off. The further movement of the lever 100 to the positions $x^1$, $x^2$ and $x^3$, then brings the intensifier into action, causes it to make its full working stroke and finally, when the lever again approaches its central position, brings the various parts into the positions shown in Fig. 1, with the exception that the press cylinder 4 is only partially raised since it occupies a position in which it is ready for another working stroke of the intensifier.

Figure 27:
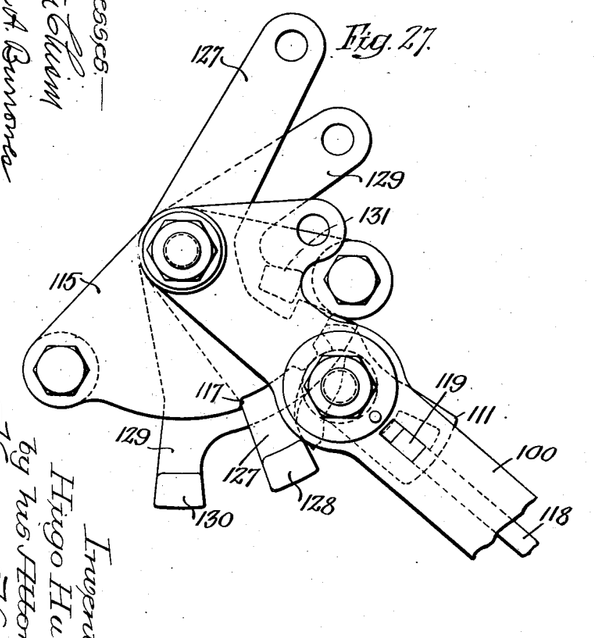
Figure 28:
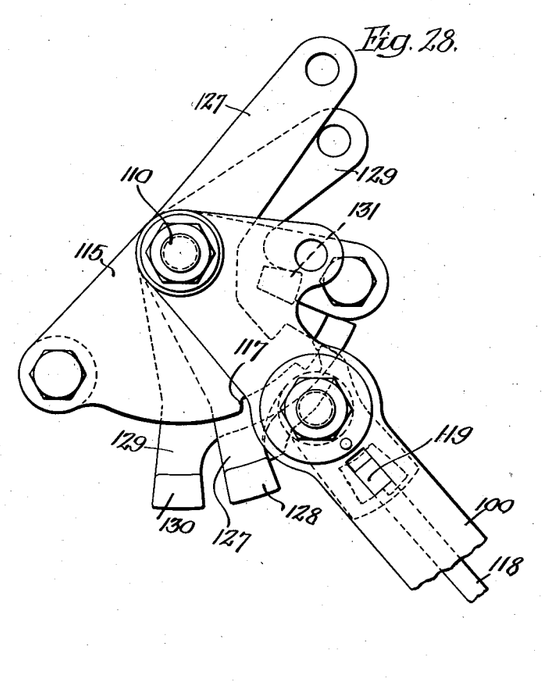
Figure 31:
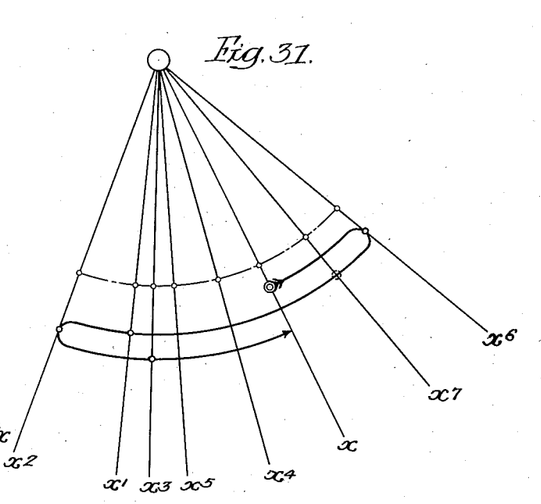

If it be desired to raise the press cylinder 4 in order that it may operate on a piece of work of larger dimensions, the lever 100 is moved from its central position $x$ first toward the right as shown in Fig. 31, and when it reaches the extreme limit of its movement as shown in Fig. 27 and as indicated at $x^6$, the hand grip 120 is pressed inwardly thereby causing the trigger 119 to disengage the shoulder 124 as previously described. In this instance, however, the pawl 113 occupies such a position as to engage the lug 128 of the lever 127 as the operating lever 100 is returned toward its central position. By the time that the lever 100 has reached the position $x^7$, the check valve 46, under action of the lever 127 is fully opened, thus placing the interior of the press cylinder and the intensifier in communication with the pipe 48 and permitting the said cylinder to move upwardly under action of the steam in the pull back cylinder 29 as the water flows into the cylinder tank 49. After the press cylinder has risen to the proper height, the movement of the operating lever 100 to its central position causes the projection 114 of the plate 111 to engage the tooth 116 of the fixed segment 115 thereby so moving said plate as to turn the pawl 114 out of engagement with the lug 128 of the lever 129 as shown in Fig. 28 and consequently allowing the check valve 46 to close. If now the operating lever be moved to the position $x^1$, the intensifier begins its working stroke as described in connection with the diagram shown in Fig. 29, while as the said lever moves to the position $x^2$ and is thereafter returned to its central position, the intensifier completes its working stroke and the press cylinder with the upper anvil is again returned to its upper position for a new working stroke.

From the above description, it will be seen that all of the various operations of the press are controlled from the single lever 100 with its hand grip 120 and it is characteristic of my invention that all of its parts are absolutely under the control of the operator at all times;—that is to say, the movement of the press cylinder with the upper anvil is dependent upon and takes place in accordance with the movement of the operating lever, permitting the press to be used with the utmost accuracy and at a high speed.

If at any time it be found necessary to examine or replace the cylinder packing 25, I remove the bolts 17 attaching the stationary plunger 10 to the cap structure 8 and so operate the controlling lever that the steam is exhausted from the pull-back cylinder. A block of wood or other suitable material of the correct size having been previously placed on the lower anvil, the press cylinder 4 with the plunger 10 then moves downwardly into the position shown in Fig. 10. Thereafter the operating lever 22 may be placed in the positions shown in Figs. 9 and 11, with its teeth 21 in mesh with the teeth 20 of the gland 18. A suitable movement of said lever 22 then gives a partial revolution to the flange, bringing its teeth 19 into line with the spaces between the projections of the upper end of the cylinder 4, whereupon said gland may be loosened and pulled upwardly by screwing down the bolts 24. Thereafter the gland may be lifted by hand or otherwise into the position shown in Fig. 10, while the packing 25 may likewise be raised and if desired removed through the space between the plunger 10 and the bolting face of the cap structure 8. By a reversal of the above described operations, a new packing may be put in place with the expenditure of a minimum of time and labor and after the gland has been replaced, the admission of steam to the pull-back cylinder will cause the press cylinder 4 and the plunger 10 to be returned to the positions shown in Fig. 9, after which the bolts 17 may be caused to rigidly connect the plunger to the cap structure.

If at any time there is a deficiency of water in the press or its associated apparatus, the raising of the press cylinder to its highest position so moves the link 75 through the lever 73—74, rod 72 and lever arms 71 and 68 as to open the steam valve 77, after which the steam pump 61 operates until the cylinder 49 is sufficiently filled with water to cause its piston 56 to force the rod 65 into position to allow closing of the valve 77.

As shown in Fig. 1, I preferably equip the press with three pressure gages, of which that on the left hand is connected to indicate the pressure in the tank 49 and should be capable of reading to at least 50 lbs. to the square inch; the gage on the extreme right hand side is connected to the steam supply pipe for the intensifier and should read to at least 150 lbs. to the square inch; while the middle gage is connected to the water cylinder of the intensifier and should be capable of reading to at least 5000 lbs. to the square inch.

I claim—

1. The combination in a forging press of a high pressure cylinder; an intensifier having a steam cylinder and a steam valve; with means for controlling said valve consisting of an operating lever connected thereto; a spirally grooved rod connected to the piston of the steam cylinder of the intensifier; a rotary threaded bushing splined to said rod; a nut mounted on the threaded part of the bushing; and means for connecting said nut with the steam valve.

2. The combination in a forging press of a high pressure cylinder; an intensifier therefor including a steam cylinder and a steam valve; a spirally grooved rod connected to the piston of said steam cylinder; a rotary bushing mounted in the upper head of the cylinder and splined to the rod; a nut threaded on the bushing and free to move longitudinally of the bushing without rotating; means for connecting said nut to the steam valve; and means for opening said valve at will.

3. The combination in a forging press including a steam hydraulic intensifier and a pull back cylinder, of a steam valve for the intensifier; a steam valve for the pull back cylinder; a water valve; and a single controlling lever governing the operation of said valves; with means for connecting said lever at will to said two last named valves.

4. The combination in a forging press including a steam hydraulic intensifier and a pull back cylinder of a steam valve for the intensifier; a steam valve for the pull back cylinder; a water valve; and a single controlling lever governing the operation of said valves; said lever being permanently connected to the steam valve of the intensifier and attachable at will to the steam valve of the pull back cylinder and to the water valve.

5. The combination in a forging press including a steam hydraulic intensifier and a pull back cylinder of a steam valve for the intensifier; a steam valve for the pull back cylinder; a water valve; a single controlling lever governing the operation of said valves; with means for detachably connecting the lever at will either to the water valve or to the steam valve of the pull back cylinder.

6. The combination in a forging press including a steam hydraulic intensifier and a pull back cylinder of a steam valve for the intensifier; a steam valve for the pull back cylinder; a water valve; a single controlling lever governing the operation of said valves; means for detachably connecting the lever at will either to the water valve or to the steam valve of the pull back cylinder; and means permanently connecting the lever to the steam valve of the intensifier.

7. The combination in a forging press including a steam hydraulic intensifier and a pull back cylinder of a steam valve for the intensifier; a steam valve for the pull back cylinder; a water valve; a single controlling lever governing the operation of said valves; means for detachably connecting either the water valve or the valve of the pull back cylinder to said operating lever at will; and means for causing both of said valves to be operated together under the action of said lever.

8. The combination in a forging press including a steam hydraulic intensifier and a pull back cylinder of a steam valve for the intensifier; a steam valve for the pull back cylinder; a water valve; and a single controlling lever governing the operation of said valves; said lever including two independently movable structures respectively connected to the water valve and to the steam valve of the pull back cylinder; a pawl for connecting either of said structures to the lever; and a device for controlling the action of the pawl.

9. The combination in a forging press including a steam hydraulic intensifier and a pull back cylinder of a steam valve for the intensifier; a steam valve for the pull back cylinder; a water valve; and a single controlling lever governing the operation of said valves; said lever including two independently movable structures respectively connected to the water valve and to the steam valve of the pull back cylinder; a pawl for connecting either of said structures to the lever; and a device for controlling the action of the pawl; one of said structures being formed to engage and move the other under predetermined conditions.

10. The combination in a forging press of a main pressure cylinder; a steam hydraulic intensifier; a water supply cylinder connected to the main pressure cylinder; a pump for delivering water to said water cylinder having a steam valve and automatic means for controlling the said valve and thereby controlling the operation of the pump; the same consisting of mechanism engaged by the movable member of the press when this is in its upper position, to open the steam valve; with mechanism controlled by the amount of water in the cylinder for permitting closing of the steam valve when there is a predetermined amount of water in said cylinder.

In testimony whereof, I have signed my name to this specification, in the presence of two subscribing witnesses.

HUGO HAISS.

Witnesses:
   WILLIAM E. BRADLEY,
   WM. A. BARR.